United States Patent
Yamamoto et al.

(10) Patent No.: US 7,068,321 B2
(45) Date of Patent: Jun. 27, 2006

(54) TELEVISION RECEIVING APPARATUS

(75) Inventors: Manabu Yamamoto, Osaka (JP);
Takahiro Katayama, Osaka (JP);
Kazuhiko Tani, Osaka (JP); Yusuke Nishida, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 654 days.

(21) Appl. No.: 10/155,309

(22) Filed: May 24, 2002

(65) Prior Publication Data

US 2002/0176028 A1 Nov. 28, 2002

(30) Foreign Application Priority Data

May 28, 2001 (JP) ............... P.2001-159296

(51) Int. Cl.
*H04N 5/60* (2006.01)
*H04N 7/08* (2006.01)
*H04N 5/44* (2006.01)

(52) U.S. Cl. .............. 348/485; 348/569; 348/738
(58) Field of Classification Search ............ 348/738, 348/553, 478, 725, 484, 465, 564, 563, 569; H04N 5/44
See application file for complete search history.

(56) References Cited

U.S. PATENT DOCUMENTS

| | | | | |
|---|---|---|---|---|
| 4,698,670 A * | 10/1987 | Matty | ............. | 725/131 |
| 5,446,505 A * | 8/1995 | Chang Soo et al. | ......... | 348/738 |
| 6,188,439 B1 * | 2/2001 | Kim | ............. | 348/553 |
| 6,411,335 B1 * | 6/2002 | Jang | ............. | 348/553 |
| 2002/0186328 A1 * | 12/2002 | Nishida et al. | ............. | 348/738 |

* cited by examiner

Primary Examiner—Michael H. Lee
(74) Attorney, Agent, or Firm—Osha Liang LLP

(57) ABSTRACT

In a television receiving apparatus, a receiving apparatus 1 has storage means for storing a voice output switching table 20 registering a voice setting record 21 having the voice output format associated with the broadcasting language of the received digital broadcasting in a control unit 2. Every time the switching operation of the voice output format is made, the voice setting record 21 is selected in the registered order. Also, the receiving apparatus 1 outputs a voice signal with the language and the voice output format based on the selected voice setting record 21 from an output portion 6. Accordingly, the broadcasting language and the voice output format of the digital broadcasting being received can be switched by single operation, resulting in enhanced operability.

3 Claims, 4 Drawing Sheets

| LANGUAGE | VOICE OUTPUT FORMAT |
|---|---|
| JAPANESE | STEREO |
| JAPANESE | MONO |
| ENGLISH | STEREO |
| ENGLISH | MONO |
| CHINESE | STEREO |
| CHINESE | MONO |
| FRENCH | STEREO |
| FRENCH | MONO |

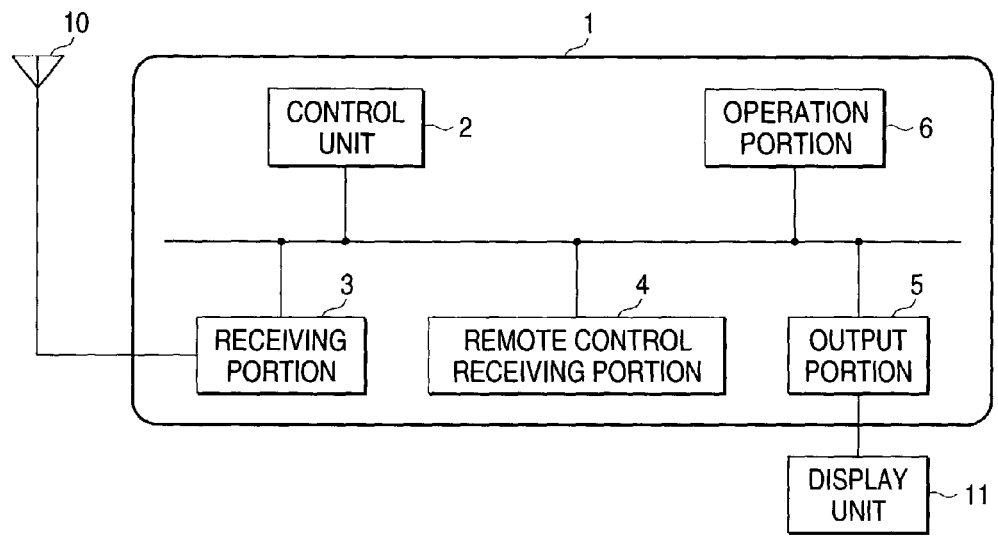

TELEVISION RECEIVING APPARATUS

BACKGROUND OF THE INVENTION

1. Field of the Invention

The present invention relates to a television receiving apparatus for receiving a digital broadcasting.

2. Description of the Related Art

In a television broadcasting of digital system (hereinafter simply referred to as a digital broadcasting), a voice signal can be broadcast in a plurality of broadcasting languages (hereinafter simply referred to as languages) such as Japanese and English, along with a video signal.

The conventional television receiving apparatus for the digital broadcasting (hereinafter simply referred to as a receiving apparatus) was configured to output a voice signal in a selected language among a plurality of languages broadcast in a received program (or a digital broadcasting at selected channel). For instance, in the case where the received program was broadcast in Japanese, English and Spanish, if Japanese was selected, the voice signal was output in Japanese, but not output in English and Spanish. Also, the user could select the voice signal (language) for output at will.

In the digital broadcasting, the number of voice channels for the voice signal is not specifically defined. For instance, in the digital broadcasting of the ATSC (Advanced Television Standards Committee) system, there is a program for broadcasting through 5.1 channels according with the Dolby digital system. Also, there is a program for broadcasting through 4 channels or 2 channels and a program for broadcasting through one channel (mono).

In the conventional typical receiving apparatus, a voice signal of the digital broadcasting being received was converted into a stereophonic voice through two channels or monophonic voice through one channel by the down mix or pseudo stereophony. Also, either the stereophonic voice through two channels or the monophonic voice through one channel was selected as the voice output format. The voice signal was output in the voice output format selected.

Thus, the conventional receiving apparatus allowed the user to select the language and the voice output format in viewing the digital broadcasting.

A device for converting a stereophonic signal over two channels into a stereophonic signal of two channels or a device for converting a stereophonic signal over two channels into a monophonic signal of one channel by down mix has been already proposed (JP-A-5-244698, JP-A-62-2852). Also, a device for converting a monophonic signal into a stereophonic signal of two channels by pseudo stereophony has been already proposed.

However, the conventional receiving apparatus of the digital broadcasting made the switching of the language and the switching between stereo and mono (voice output format) by separate operations. Therefore, the user had to perform an operation for switching the language (or voice output format), and then an operation for switching the voice output format (or language), whereby there was a problem that the switching operations for the language and the voice output format were complex, and poor in operability.

SUMMARY OF THE INVENTION

It is an object of the present invention to provide a television receiving apparatus that enable the switching for the broadcasting language and the voice output format to be made by a single operation, with enhanced operability.

The television receiving apparatus of this invention has the following constitutions to solve the above-mentioned problems.

(1) A television receiving apparatus for receiving a digital broadcasting at a selected channel, comprising, storage means for storing a voice output switching table registering a voice setting record having a voice output format associated with a broadcasting language of the received digital broadcasting, voice setting record selection changing means for changing the selection of the voice setting record registered in the voice output switching table, and voice signal output means for outputting a voice signal on the basis of the voice setting record selected by the voice setting record selecting means.

With this constitution, the voice output switching table registering the voice setting record having the voice output format (voice channel number) associated with the broadcasting language of the digital broadcasting being received is stored in the storage means. The voice signal output means outputs the broadcasting language and the voice output format (voice channel number) on the basis of the selected voice setting record. The voice setting record selection changing means changes the selection of the voice setting record registered in the voice output switching table.

Accordingly, both of the broadcasting language and the voice output format can be switched by single operation of changing the selection of the voice setting record registered in the voice output switching table.

(2) The television receiving apparatus further comprises table updating means for updating the voice output switching table by extracting the broadcasting language for use in the received digital broadcasting.

With this constitution, since the voice output switching table is updated by the table updating means, the voice output switching table according to the received digital broadcasting can be stored in the storage means. Accordingly, the broadcasting language unavailable in the received digital broadcasting can not be selected.

The voice output switching table is updated or the table updating means is executed, 1) when the main power supply of the apparatus is turn on,
2) when the receiving channel of the digital broadcasting is switched,
3) at every fixed interval.

(3) The voice setting record selection changing means changes the voice setting record to be selected in the order registered in the voice output switching table.

(4) The television receiving apparatus further comprises video output means for outputting a video signal for displaying the contents of the voice setting record selected by the voice setting record selection changing means for a fixed period of time.

With this constitution, the broadcasting language and the voice output format switched are displayed on a display unit connected to the video output means for the fixed period of time. Accordingly, the user can confirm the broadcasting language and the voice output format switched, whereby it is possible to avoid a selection error of the broadcasting language and the voice output format.

BRIEF DESCRIPTION OF THE DRAWINGS

FIG. 1 is a block diagram showing the configuration of a receiving apparatus according to an embodiment of the present invention;

FIGS. 2A and 2B show voice output switching tables of the receiving apparatus according to the embodiment of the invention;

DETAILED DESCRIPTION OF THE PREFERRED EMBODIMENTS

Figure 3A:
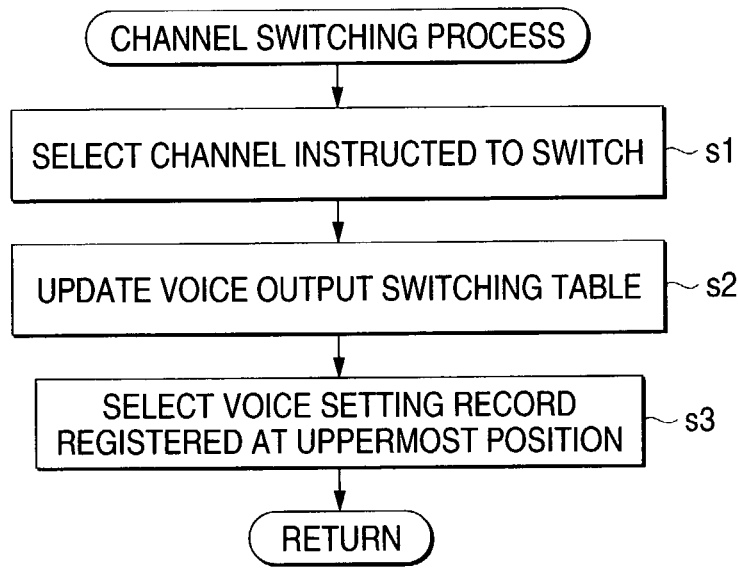
FIGS. 3A and 3B are flowcharts showing a channel switching process in the receiving apparatus according to the embodiment of the invention.

Now, a description will be given in more detail of preferred embodiments of the invention with reference to the accompanying drawings.

A receiving apparatus according to an embodiment of the present invention will be described below in detail. The receiving apparatus of this embodiment receives the digital television broadcasting (hereinafter simply referred to as a digital broadcasting).

FIG. 1 is a block diagram showing the configuration of the receiving apparatus according to this embodiment of the invention. The receiving apparatus 1 receives the digital broadcasting of the ATSC (Advanced Television Standards Committee) method. A control unit 2 controls the entire operation of the receiving apparatus 1. A receiving portion 3 accepts a broadcasting signal (digital broadcasting signal) of a program at a selected channel from the digital broadcasting received at an antenna 10. The receiving portion 3 is provided with a demultiplexer for demultiplexing the digital broadcasting signal multiplexed and a decoder for decoding a video signal or a voice signal that is compressed.

A remote control receiving portion 4 receives a control signal transmitted by infrared ray or electric wave from a remote controller, not shown, for example, a channel switching signal, or a voice output switching signal as will be later described. An output portion 5 outputs the video signal and the voice signal received by the receiving portion 3 and decoded. A display unit 11 displays an image (video) on the screen based on the video signal output from the output portion 5, and outputs the voice based on the voice signal. An operation portion 6 has the keys for use in making the channel switching operation or the voice output switching operation as will be described later.

As well known, the video signal and the voice signal of broadcasting languages (hereinafter simply referred to as languages) such as Japanese and English can be transmitted in the digital broadcasting. Also, the number of voice channels for the voice signal is not specifically limited, and the broadcasting is made with a stereophonic signal of 5.1 channels, 4 channels or 2 channels or a monophonic signal of one channel.

The receiving apparatus 1 of this embodiment comprises a circuit for converting the voice signal over two channels received by the receiving portion 3 into the stereophonic signal of two channels and the monophonic signal of one channel by down mix in the output portion 5. Also, the receiving apparatus 1 comprises a circuit for converting the voice signal of one channel received by the receiving portion 3 into the stereophonic signal of two channels by pseudo stereophony in the output portion 5. The receiving apparatus 1 of this embodiment outputs the voice signal of the digital broadcasting received by the receiving apparatus 3 in the voice output format of the stereophonic signal of two channels or the monophonic signal of one channel from the output portion 5.

Also, the receiving apparatus 1 of this embodiment has a voice output switching table 20 of FIGS. 2A and 2B stored in the control unit 2. The voice output switching table 20 has registered a voice setting record 21 for setting the voice output format for each language of the voice signal broadcast in the received program (program broadcast through the selected channel). Specifically, it is a table registering the voice setting record 21 that is stereophonic (two channels) in the voice output format and the voice setting record 21 that is monophonic in the voice output format. FIG. 2A is an example of the voice output switching table 20 at the time of receiving the program broadcast in three languages of Japanese, English and Spanish. FIG. 2B is an example of the voice output switching table 20 at the time of receiving the program broadcast in four languages of Japanese, English, Chinese and French.

The receiving apparatus 1 of this embodiment has the voice setting records 21 with the same language registered up and down in the voice output switching table 20, as illustrated. When a specific key (a voice output switching key) provided in the operation portion 6 is operated, or when a specific control signal (a voice output switching control signal) sent from the remote controller, not shown, is received in the remote control receiving portion 4, the voice setting record 21 registered directly under the voice setting record 21 selected at present is selected. For instance, when the voice setting record 21 is selected having the language of Japanese and the voice output format of STEREO (two channels), as shown in FIG. 2A, the voice setting record 21 having the language of JAPANESE and the voice output format of MONO (monophonic) is selected, if the switching of the voice output is instructed. If there is no voice setting record 21 registered under the voice setting record 21 selected at present (the voice setting record 21 selected at present is registered at the lowest position), the voice setting record 21 registered at the uppermost position is selected. For instance, when the voice setting record 21 having the language of SPANISH and the voice output format of MONO is selected as shown in FIG. 2A, the voice setting record having the language of JAPANESE and the voice output format of STEREO is selected, if the switching of the voice output is instructed.

The receiving apparatus 1 of this embodiment outputs the voice signal from the output portion 5, on the basis of the selected voice setting record 21. Accordingly, the voice signal (language and voice output format) output from the output portion 5 can be switched by changing the selection of the voice setting record 21.

Further, this voice output switching table 50 is updated 3) when the main power supply of the apparatus is turn on, 4) when the receiving channel of the digital broadcasting is switched, 5) at every fixed interval.

An updating process of the voice output switching table 20 will be described later.

The operation of the receiving apparatus 1 of this embodiment will be described below. First of all, a receiving process of the digital broadcasting in the receiving apparatus 1 of this embodiment will be simply stated.

The receiving apparatus 1 of this embodiment receives a program (digital broadcasting signal) broadcast through the selected channel in the receiving portion 3. The receiving portion 3 demultiplexes the multiplexed video signal or voice signal and decodes the compressed video signal or voice signal.

The receiving apparatus 1 outputs the voice signal with the language and the voice output format (stereophonic of two channels, monophonic of one channel) based on the selected voice setting record 21 from the output portion 5. If the number of voice channels for the voice signal of the program received in the receiving portion 3 is different from the voice output format of the selected voice setting record 21, the down mix or pseudo stereophony is made in the output portion 5 for the conversion into the voice signal of the voice output format based on the selected voice setting record 21. Also, the output portion 5 outputs the video signal.

The display unit 11 produces the voice on the basis of the voice signal output from the output portion 5, and displays an image (video) on the screen on the basis of the video signal. Accordingly, the user can view the program broadcast at the selected channel in the language and the voice output format based on the selected voice setting record 21.

The receiving apparatus 1 makes the receiving process of the digital broadcasting, and performs the processing according to an input operation in the operation portion 6 if the input operation such as a switching operation of the channel or a switching operation of the voice output in the operation portion 6 is conducted. Also, if the remote control receiving portion 4 receives a control signal such as a channel switching signal or a voice output switching signal sent from the remote controller, not shown, the receiving apparatus 1 performs the processing according to the received control signal.

The channel switching process will be described below. The receiving apparatus 1 performs the channel switching operation, when the channel switching operation is made in the operation portion 6, or when the remote control receiving portion 4 receives a channel switching signal.

FIG. 3A is a flowchart showing a channel switching process in the receiving apparatus of this embodiment. The receiving apparatus 1 makes a channel selection in which the channel of the digital broadcasting received in the receiving portion 3 is switched into the instructed channel (s1). If the channel selection of the instructed channel is completed, a voice output switching table updating process is performed as shown in FIG. 3B (s2).

Figure 3B:
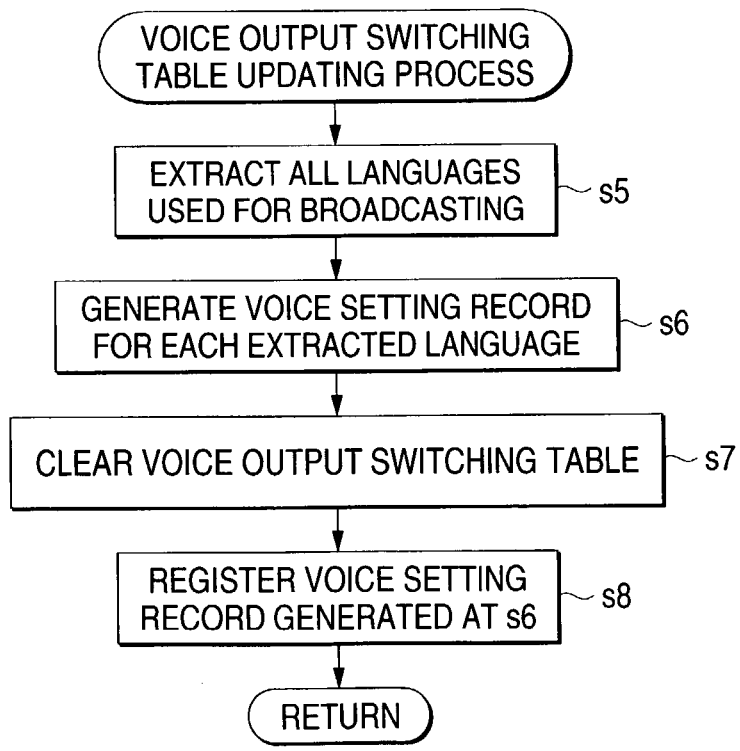

Referring to FIG. 3B, the voice output switching table updating process will be described below. All the languages for the program broadcast through the channel selected at step s1 are extracted (s5). For each language extracted at step s5, two voice setting records 21 in which the voice output format is stereophonic and monophonic are generated (s6). The voice output switching table 20 is cleared, and all the voice setting records 21 generated at step s6 are registered in the voice output switching table 20. At step s8, the voice setting records 21 are registered in the voice output switching table 20 so that the same language is arranged up and down (in the order of stereo and mono).

With the voice output switching table updating process as shown in FIG. 3B, the voice output switching table 20 according to the channel selected at step s1 can be generated. The receiving apparatus 1 has this voice output switching table 20 stored in the control unit 2.

The receiving apparatus 1 selects the voice setting record 21 registered at the uppermost position in the voice output switching table 20 generated in the voice output switching table updating process (s3), and this channel switching process is ended. Alternatively, if the same voice setting record 21 as that selected by the user at the previous time is contained in the voice output switching table 20, it may be selected. Thereafter, the receiving apparatus 1 outputs the voice signal with the language and the voice output format based on the voice setting record 21 selected at step s3 from the output portion 5, and starts the receiving process to output the video signal.

Thereby, the user can view the program broadcast through the channel switched at step s1.

The voice output switching process will be described below. The receiving apparatus 1 performs this voice output switching process, when the switching operation of the voice output is made in the operation portion 6, or when the remote control receiving portion 4 receives a voice output switching signal (a voice output switching instruction is made).

Figure 4:
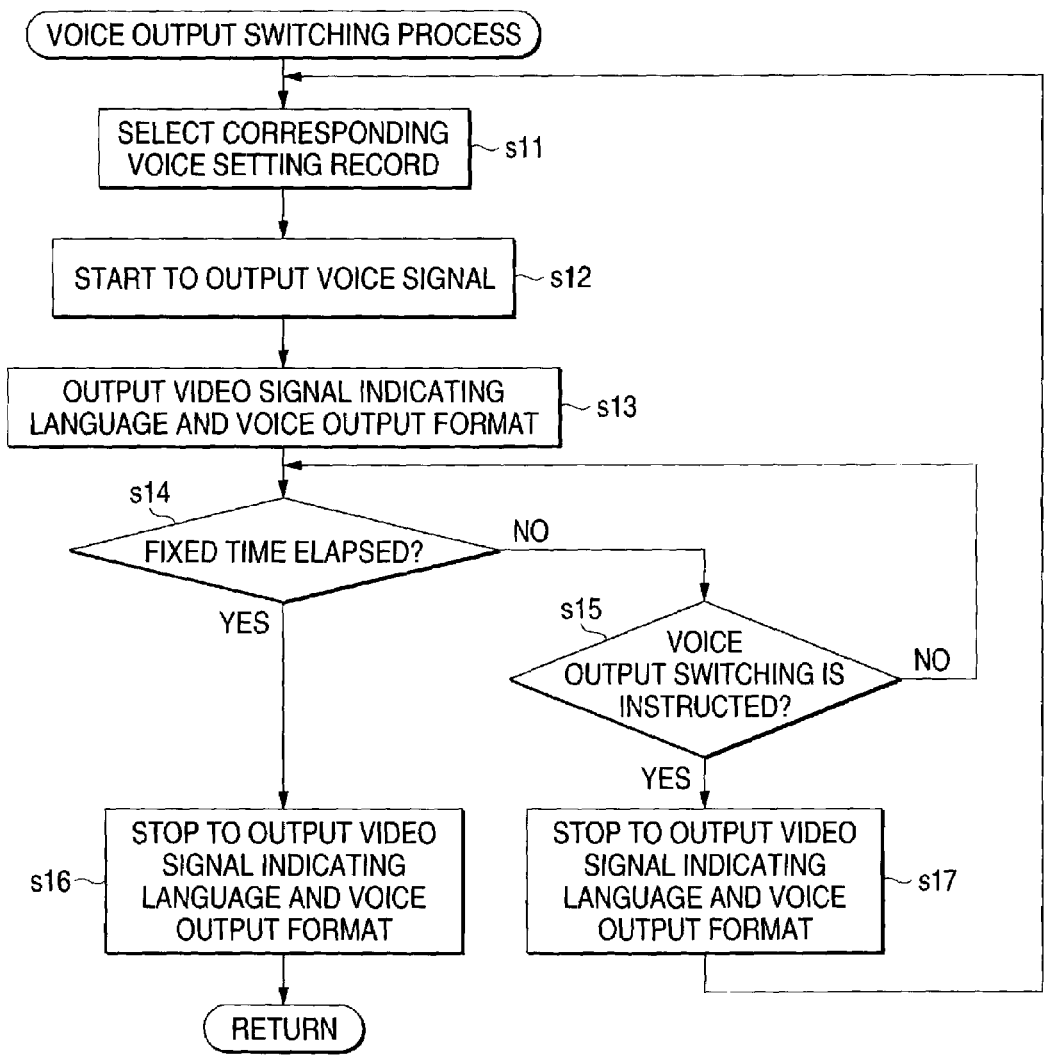
FIG. 4 is a flowchart showing a voice output switching process in the receiving apparatus according to the embodiment of the invention.

FIG. 4 is a flowchart showing the voice output switching process. The receiving apparatus 1 selects the voice setting record 21 registered directly under the voice setting record 21 selected at present in the voice output switching table 20 (s11). If the voice setting record 21 selected at present is registered at the lowermost position, the voice setting record 21 registered at the uppermost position is selected.

The receiving apparatus 1 starts to output the voice signal with the language and the voice output format based on the voice setting record 21 selected at step s11 from the output portion 5 (s12). Also, the video signal indicating the language and the voice output format of the voice signal that starts to be output at s12 is output from the output portion 5 (s13).

Figure 5A:
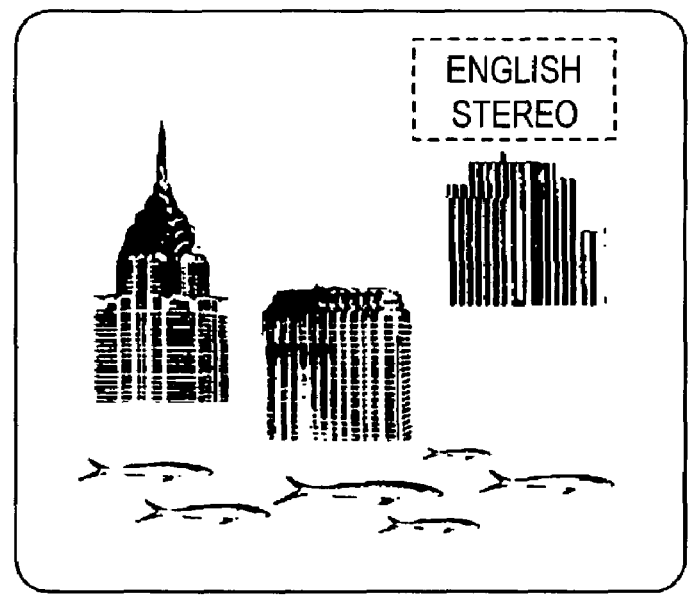
FIGS. 5A and 5B are views showing two display examples of the video displayed on a display unit connected to the receiving apparatus according to the embodiment of the invention.
Figure 5B:
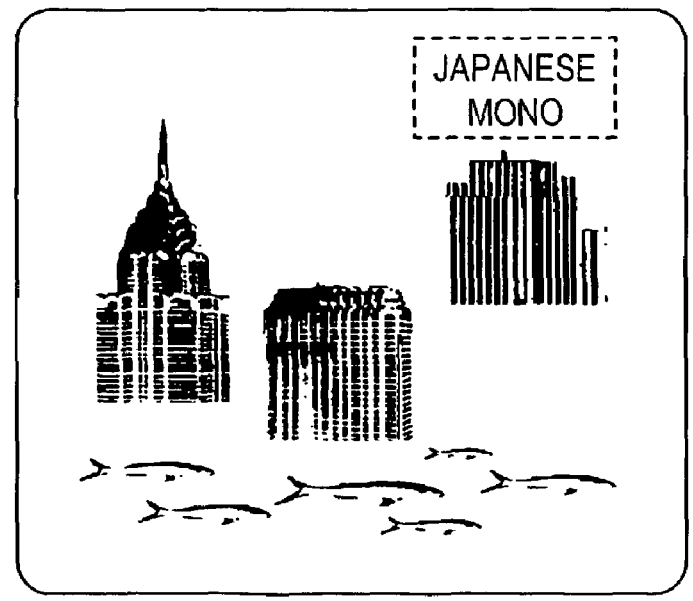

At step s13, the video signal displaying the language and the voice output format (stereo or mono) on the upper right side of the video for the program received in the receiving portion 3 is output. Specifically, the video signal for displaying the image on the screen of the display unit 11 is output as shown in FIGS. 5A and 5B. FIG. 5A is an example for selecting the voice setting record 21 in which the language is ENGLISH and the voice output format is STEREO, and FIG. 5B is an example for selecting the voice setting record 21 in which the language is JAPANESE and the voice output format is MONO. The video for the received program is also displayed on the screen of the display unit 11.

The receiving apparatus 1 waits for a fixed time to lapse or a voice output switching instruction is made again after the end of the processing at step s13 (s14, s15).

The receiving apparatus 1 stops to output the video signal indicating the language and the voice output format that is started at step s13, upon detecting that a fixed period of time has passed at step s14 (s16), and this process is ended. Thereafter, the receiving apparatus 1 performs the above receiving process. At this time, the receiving apparatus 1 outputs the voice signal with the language and the voice output format on the basis of the voice setting record 21 selected in the voice output switching process.

On the other hand, the switching operation of the voice output is performed in the operation portion 6 or the remote controller, before the elapse of the fixed period of time. If the voice output switching instruction is made again, at step s17, the receiving apparatus 1 stops to output the voice signal with the language and the voice output format that is started at step s13. Then the operation returns to step s11. Steps s16 and s17 are the same processing.

In this way, in the receiving apparatus 1 of this embodiment, the switching operation of the voice output is repeatedly performed in the operation portion 6 or the remote controller, whereby the voice setting record 21 registered in the voice output switching table 20 can be selected in the registered order. Accordingly, the user can select the voice setting record 21 with the language and the voice output format according to one's preference. Therefore, the user can view the program with the language and the voice output format according to one's preference.

Since the switching operation of the language and the voice output format can be made by a single operation, the switching of the language and the voice output format can be simply effected, resulting in enhanced operability.

Since the voice output switching table 20 is updated at the time of switching the channel, the voice output switching table 20 according to the program received in the receiving portion 3 can be stored in the storage of the receiving apparatus. Accordingly, the broadcasting language unavailable in the received program cannot be selected.

The updating process of the voice output switching table as shown in FIG. 3B may be made not only at the time of switching the channel but also when the power source of the receiving apparatus is turned on, or at every fixed interval.

Thereby, the voice output switching table 20 according to the program received in the receiving portion 3 can be stored more securely.

Since the language and the voice output format selected are displayed on the screen of the display unit 11 every time the selection of the voice setting record 21 is switched, the user can perform the selecting operation of the language and the voice output format while confirming the language and the voice output format selected at present. Accordingly, it is possible to avoid a selection error of the voice setting record 21, resulting in the enhanced operability.

As described above, with the present invention, the broadcasting language and the voice output format for the digital broadcasting being received can be switched by single operation, resulting in the enhanced operability.

Since the voice output switching table is updated, the broadcasting language unavailable in the received digital broadcasting cannot be selected.

Further, since the user can make the selecting operation of the broadcasting language and the voice output format while confirming the broadcasting language and the voice output format selected at present, it is possible to avoid a selection error of the voice setting record, resulting in the enhanced operability.

What is claimed is:

1. A television receiving apparatus for receiving a digital broadcasting at a selected channel, comprising:
    storage means for storing a voice output switching table registering a voice setting record having a voice output format associated with a broadcasting language of the received digital broadcasting;
    table updating means for updating said voice output switching table by extracting the broadcasting language of the received digital broadcasting, when the channel of the received digital broadcasting is switched;
    voice setting record selection changing means for changing the selection of said voice setting record in the order registered in said voice output switching table;
    voice signal output means for outputting a voice signal on the basis of said voice setting record selected by said voice setting record selecting means; and
    output means for outputting a video signal for displaying the contents of said voice setting record selected by said voice setting record selection changing means for a fixed period of time.

2. A television receiving apparatus for receiving a digital broadcasting at a selected channel, comprising:
    storage means for storing a voice output switching table registering a voice setting record having a voice output format associated with a broadcasting language of the received digital broadcasting;
    voice setting record selection changing means for changing the selection of said voice setting record registered in said voice output switching table;
    voice signal output means for outputting a voice signal on the basis of said voice setting record selected by said voice setting record selecting means: and.
    table updating means for updating said voice output switching table by extracting the broadcasting language of the received digital broadcasting.

3. The television receiving apparatus according to claim 2, wherein said table updating means updates said voice output switching table when the channel of the received digital broadcasting is switched.

* * * * *